July 18, 1961     H. E. PYWELL     2,993,148
CIRCUIT PROTECTING APPARATUS
Filed June 14, 1957
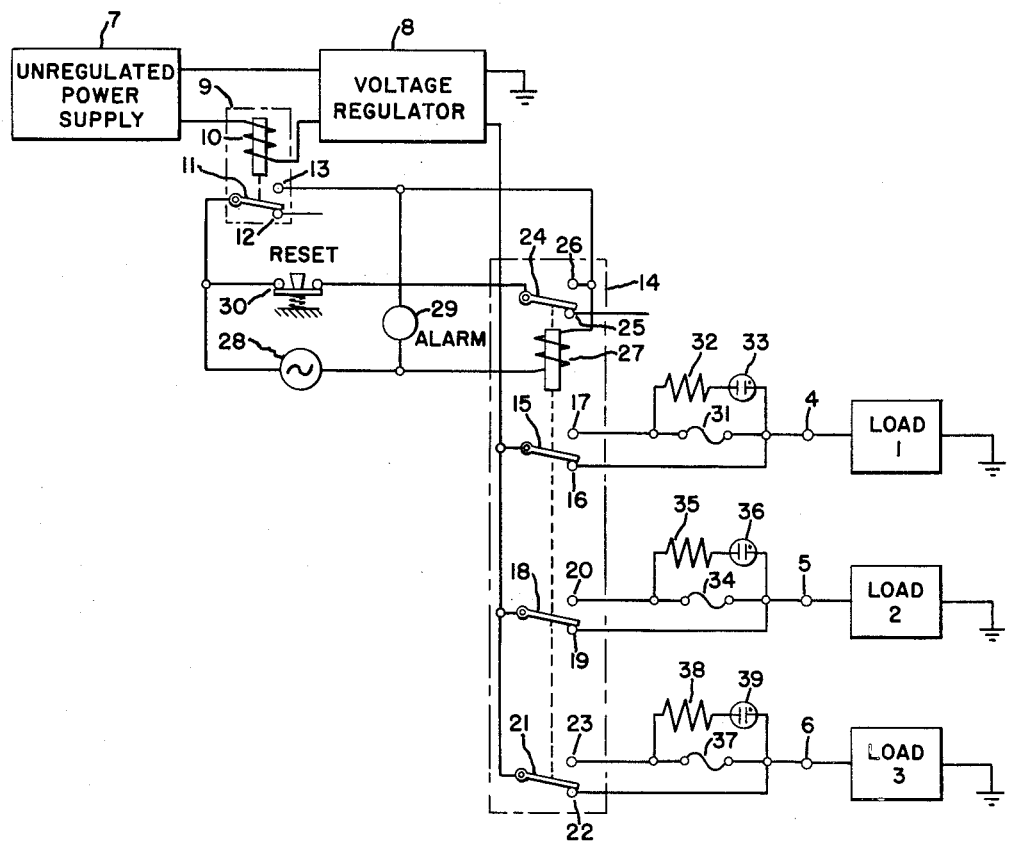
INVENTOR:
HARRY E. PYWELL,
BY Donald C. Kearoney
HIS ATTORNEY.

United States Patent Office 2,993,148
Patented July 18, 1961

2,993,148
CIRCUIT PROTECTING APPARATUS
Harry E. Pywell, North Syracuse, N.Y., assignor to General Electric Company, a corporation of New York
Filed June 14, 1957, Ser. No. 665,759
7 Claims. (Cl. 317—26)

This invention relates to electrical circuit protecting and fault detecting apparatus. More particularly this invention relates to apparatus for protecting supply circuits such as power supply and voltage regulator circuits against short circuits in a multiple load type of equipment where high reliability and low output impedance are prime requisites.

There are many different types of equipment wherein a single circuit supplies electrical energy either as power or signal to a plurality of utilization circuits. Such equipment includes, for example, radar systems in which a plurality of video amplifiers are operated in parallel from the same voltage regulated power supply, and computer systems in which a plurality of amplifiers or other stages having large dynamic current requirements are similarly operated in parallel from a single voltage or current regulated source of energy. When maximum reliability of operation of the overall equipment is required, it is common practice to provide one or more energized spare utilization circuits available for immediate replacement switching in the event of failure of any one of the utilization circuits.

Many of the above noted types of equipment require a voltage regulated power supply having an output impedance which is lower than the impedance of a fuse of the size necessary to protect the utilization circuits. Unless the supply circuit is fused, however, a short circuit or high overcurrent occurring in one of the utilization or load circuits can disable the entire power supply and thus destroy the reliability provided by the spare unit before it can be switched in. Such equipments have in the past therefore been faced with a choice between sacrificing the desired low output impedance of the supply circuit or sacrificing the operating reliability of the overall equipment.

It is therefore an object of this invention to provide improved electrical circuit protecting apparatus.

It is a further object of this invention to provide a high reliability multi-load low impedance power supply.

It is a further object of this invention to provide apparatus for protecting an electrical energy supply circuit without introducing fuse impedance in said circuit during its normal operation.

It is a further object of this invention to provide fault detecting apparatus adapted for use in any apparatus of the type wherein a plurality of utilization circuits derive electrical energy in any form from a single supply circuit.

Briefly, in accordance with one aspect of the invention, these objects are achieved by connecting each of the load or utilization circuits to the supply circuit through a switching means such as a relay. Under normal operating conditions each of the utilization circuits is directly connected to the supply circuit which is provided with means for detecting the effects of an abnormal operating condition in any one or more of the utilization circuits. The detecting means is further connected to actuate the switching or relay means associated with the utilization circuits in response to any abnormal operating condition and to thereby switch an individual fuse or other independent circuit protective element in circuit between each of the utilization circuits and the supply circuit. When this happens the fuse associated with the circuit in which the fault has occurred will be blown but all the rest of the load circuits will continue to operate with slightly reduced performance due to the added fuse impedance until the malfunction is corrected and the protective circuit reset.

While the novel and distinctive features of the invention are particularly pointed out in the appended claims, a more expository treatment of the invention, in principle and in detail, together with additional objects and advantages thereof, is afforded by the following description and accompanying drawing in which:

FIG. 1 is a block and schematic circuit diagram of a circuit protecting and fault detecting apparatus.

An illustrative embodiment of the invention is shown in FIG. 1 in which a plurality of load or utilization circuits such as 1, 2 and 3 are connected between ground and output terminals 4, 5 and 6 respectively of a protected supply circuit. The supply circuit includes an unregulated power supply 7 and a voltage regulator 8. Power supply 7 and voltage regulator 8 may consist of any conventional circuitry for supplying energy and are shown by way of example only. An over-current relay 9 has its coil 10 connected in series between power supply 7 and voltage regulator 8. The arm 11 of relay 9 is normally spring biased to the open contact 12. When relay 9 is actuated by a flow of current above a predetermined level through coil 10, arm 11 is moved from contact 12 to contact 13. Of course, in the circuit shown, this predetermined level is determined by the rated output current of the supply circuit and the plural load requirements.

The output of voltage regulator 8 is applied to terminals 4, 5 and 6 through a switching means which may, for example, consist of a plural arm relay 14. Arms 15, 18 and 21 of relay 14 are connected in parallel to voltage regulator 8. Each of these arms is spring biased to normally make with contacts 16, 19 and 22 respectively as shown in FIG. 1. Contacts 16, 19 and 22 are in turn respectively connected to output terminals 4, 5 and 6 to which the load or utilization circuits are adapted to be connected. Relay arms 15, 18 and 21 are mechanically ganged with another arm 24 which is connected in a holding circuit and is adapted to be actuated by over-current relay or fault detector 9. Arm 24 is spring biased to normally make with open contact 25 and is normally connected through a reset switch 30 to one side of an auxiliary source of power 28. The other side of power source 28 is connected through the holding coil 27 to the contact 13 of over-current relay 9. A visual or audible alarm 29 is connected in parallel with coil 27.

When an excessive current flowing through coil 10 actuates relay 9 causing arm 11 to move from terminal 12 to terminal 13, a circuit is completed which supplies power from source 28 to coil 27 and simultaneously actuates the alarm 29. Actuation of coil 27 moves relay arm 24 from contact 25 to contact 26 and thus completes the holding circuit for coil 27 through the normally closed reset switch 30 so that arm 24 is held to contact 26 even after cessation of current flow through coil 10 permits arm 11 to return to contact 12. Of course, as indicated above, the movement of arm 24 from contact 25 to contact 26 in turn causes arms 15, 18 and 21, which are mechanically linked to arm 24, to move from their normal positions on contacts 16, 19 and 22 respectively to contacts 17, 20 and 23 respectively.

A circuit protecting device, which may for example be a slow-blow fuse 31, is connected in parallel with a current limiting resistor 32 and an indicator, such as a glow lamp 33, between contact 17 and output terminal 4. Similar circuit protective devices 34 and 37 are connected in parallel with corresponding current limiting means 35 and 38 and indicator means 36 and 39 between contact 20 and output terminal 5 and between contact 23 and output terminal 6 respectively. Of course it will be understood that one such circuit configuration is associated with each output terminal no matter how many terminals and utilization circuits are required in any particular equipment. Three output terminals circuits are shown herein merely for convenience of illustration.

In operation, it will be apparent that if a short circuit or abnormal operating condition in any one of the exemplary loads 1, 2 or 3 draws an over-current, over-current relay 9 will be actuated, that is, the excessive flow of current through coil 10 moves arm 11 from contact 12 to contact 13. As noted above, this in turn completes a circuit whereby power is applied from source 28 to holding coil 27 which in turn causes relay arm 24 to move from contact 25 to contact 26. The movement of relay arm 24 carries relay arms 15, 18 and 21 with it thereby inserting individual fuses 31, 34 and 37 in circuit with each of the loads 1, 2 and 3. Assuming, for example, that a short circuit has occurred in load 2 only, then fuse 34 will be blown and indicator lamp 36 will be actuated. Meanwhile power will still be supplied to loads 1 and 3 at a somewhat reduced efficiency due to the additional impedance of fuses 31 and 37 which now appear as part of the output impedance measured at terminals 4 and 6.

As soon as relay arms 15, 18 and 21 are moved from their normal to their protective position, the over-current will be eliminated and relay arm 11 will go back to contact 12 due to its spring biasing. Coil 27, however, will hold the arms of relay 14 in their protective position since its holding circuit has been completed through reset button or switch 30. As soon as the operator has noted which of the indicators 33, 36 or 39 has been actuated and has either made any necessary repairs in the load circuit or has switched a stand-by or replacement load circuit in its place, he replaces the associated fuse and presses the reset button 30. This in turn breaks the circuit through coil 27 and permits relay arms 24, 21, 18 and 15 to return to their normal position under the influence of their spring biasing. The circuit is thus returned to its normal operating state in which none of the fuses affects the output impedance of the supply.

Of course it will be understood that detecting device 9 need not be an over-current relay but can be any device which is responsive to the effects on the supply circuit of whatever abnormal operating condition one is interested in detecting and protecting against. Furthermore detecting device 9 could alternatively be placed in circuit between voltage regulator 8 and the output terminal. The circuit position shown in the drawing has the advantage that the impedance of the over-current relay does not affect the output impedance of voltage regulator 8. However, the impedance of the detecting device could be made much smaller than that of a fuse so that the alternative position may be used if desired.

Furthermore relay 14 can, of course, be equivalently replaced by any electromechanical, electronic or other switching means.

Finally it should be pointed out that the supply circuit protected need not be a voltage regulated power supply, but could be any circuit for supplying electrical energy in any form to a plurality of utilization circuits.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits of the true spirit and scope of the invention.

What I claim and desire to obtain by Letters Patent of the United States is:

1. In apparatus adapted to supply electrical energy to a plurality of utilization circuits, a supply circuit; a plurality of output terminals adapted for connection to said plurality of utilization circuits respectively; switching means connecting said plurality of output terminals in parallel to said supply circuit, said switching means having a first state in which each of said output terminals is directly connected in a low impedance circuit to said supply circuit and a second state in which an individual control element is serially connected in circuit between each of said output terminals and said supply circuit; overload detecting means connected to said supply circuit to detect the effect on said supply circuit of an overload condition in any one or more of said utilization circuits; said detecting means being connected to actuate said switching means from said first state to said second state in response to said detected effect of an overload condition; each of said control elements comprising independent fuse means to interrupt the supply of energy to the circuit in which it is connected in response to an overload condition in said circuit.

2. In apparatus for protecting an electrical supply circuit, a plurality of output terminals, each of said terminals being adapted to be connected to a utilization circuit, means for connecting a fuse in circuit between said supply circuit and each of said output terminals in response to an overload current comprising, a plurality of two-contact switches, each switch being associated respectively with one output terminal, a first of said contacts being directly connected to its associated output terminal, the second of said contacts being connected to said associated output terminal through a fuse, the arm of each of said switches being connected to the output of said supply circuit and being normally biased to make with said first contact; a normally-open over-current relay connected to said supply circuit so as to be closed by a flow of current therethrough in excess of a predetermined value; a holding relay, the coil of said holding relay being connected to an auxiliary source of power through said over-current relay so as to be actuated by the closing of said over-current relay, the arm of said holding relay being ganged to the arms of said two-contact switches so that actuation of said holding relay moves the arms of said two contact switches from said first to said second contact to insert said fuses in circuit with said supply circuit.

3. Apparatus as in claim 2 wherein a current limiting resistor and a glow lamp are connected in parallel with each of said fuses and wherein an electrically actuated alarm means is connected in parallel with the coil of said holding relay.

4. Apparatus as in claim 2 wherein said supply circuit comprises a voltage regulator circuit and an unregulated power supply circuit, and wherein the coil of said over-current relay is connected in series between said power supply and said voltage regulator circuits.

5. Electrical circuit protection and fault detection apparatus comprising, an unregulated power supply circuit, a voltage regulator circuit, and a plurality of utilization circuits; relay switching means connecting said plurality of utilization circuits in parallel to said voltage regulator circuit, said relay switching means having a first position in which each of said utilization circuits is directly connected to said voltage regulator circuit and a second position in which an individual fuse element and an indicator are connected in circuit between each of said utilization circuits and said voltage regulator circuit, said relay switching means being normally biased to said first position; an over-current sensing device connected in circuit between said power supply circuit and said voltage regulator, said over-current sensing device being further connected to actuate said relay switching means to said second position in response to a flow of current above a predetermined level from said power supply to said voltage regulator; each of said indicators comprising independent means responsive to an open circuit condition of its associated fuse to indicate the existence of overload conditions in any one or more of said plurality of utilization circuits.

6. In combination, a source of electrical energy, a plurality of utilization circuits, a coupling means for coupling energy from said source to each of said utilization circuits, said ocupling means having a first operative state wherein energy is coupled from said source to each of said utilization means by individual low impedance non-fusing circuits, and a second operative state wherein energy is coupled from said source to each of said utilization circuits by individual relatively high impedance fusing circuits, said coupling means normally coupling energy from said source to each of said utilization circuits while in said first state, means responsive to the effect on said energy source of an overload condition in any one or more of said utilization circuits for changing the operation of said coupling means from said first to said second state, said relatively high impedance fusing circuits responsive only to the utilization circuits having the abnormal operating conditon for stopping the coupling of energy from said source to such utilization circuits while permitting energy to be coupled to the remaining utilization circuits.

7. In combination, a source of electrical energy, a plurality of utilization circuits, a coupling means for coupling energy from said source to each of said utilization circuits, said coupling means having a first operative state wherein energy is coupled from said source to each of said utilization means by individual low impedance non-fusing circuits, and a second operative state wherein energy is coupled from said source to each of said utilization circuits by individual relatively high impedance fusing circuits, said coupling means normally coupling energy from said source to each of said utilization circuits while in said first state, means responsive to the effect on said energy source of an abnormal operating condition in any one or more of said utilzation circuits for changing the operation of said coupling means from said first to said second state, said relatively high impedance fusing circuits responsive only to the utilization circuits having the overload condition for stopping the coupling of energy from said source to such utilization circuits while permitting energy to be coupled to the remaining utilization circuits, means for reestablishing the coupling of energy from said source only to each of said remaining utilization circuits through low impedance non-fusing circuits comprising means for changing the operation of said coupling means from said second to said first state.

References Cited in the file of this patent
UNITED STATES PATENTS

| | | |
|---|---|---|
| 2,056,040 | Dozler | Sept. 29, 1936 |
| 2,324,451 | Wood | July 13, 1943 |
| 2,545,760 | Blanchard | Mar. 20, 1951 |
| 2,607,029 | Kesselring | Aug. 12, 1952 |
| 2,823,338 | Edsall | Feb. 11, 1958 |
| 2,839,709 | Baumgartner | June 17, 1958 |

FOREIGN PATENTS

| | | |
|---|---|---|
| 653,787 | Germany | Dec. 3, 1937 |